United States Patent [19]
Dahlen

[11] Patent Number: 5,317,749
[45] Date of Patent: May 31, 1994

[54] METHOD AND APPARATUS FOR CONTROLLING ACCESS BY A PLURALITY OF PROCESSORS TO A SHARED RESOURCE

[75] Inventor: Dennis J. Dahlen, Rhinebeck, N.Y.

[73] Assignee: International Business Machines Corporation, Armonk, N.Y.

[21] Appl. No.: 951,486

[22] Filed: Sep. 25, 1992

[51] Int. Cl.⁵ .......................................... G06F 13/364
[52] U.S. Cl. .................... 395/725; 395/425; 364/228.1; 364/228.3; 364/246.6; 364/246.8; 364/DIG. 1
[58] Field of Search ............... 395/425, 400, 725, 600, 395/650, 775

[56] References Cited

U.S. PATENT DOCUMENTS

| | | | |
|---|---|---|---|
| 3,735,360 | 5/1973 | Anderson et al. | 395/250 |
| 4,070,706 | 1/1978 | Scheuneman | 395/425 |
| 4,099,243 | 7/1978 | Palumbo | 395/425 |
| 4,214,304 | 7/1980 | Shimizu et al. | 395/425 |
| 4,480,304 | 10/1984 | Carr et al. | 364/200 |
| 4,574,350 | 3/1986 | Starr | 395/725 |
| 4,733,352 | 3/1988 | Nakamura et al. | 395/425 |
| 4,875,159 | 10/1989 | Cary et al. | 395/600 |
| 4,975,833 | 12/1990 | Jinzaki | 364/200 |
| 4,984,153 | 1/1991 | Kregness et al. | 395/425 |
| 5,003,464 | 3/1991 | Ely et al. | 395/650 |
| 5,043,876 | 8/1991 | Terry | 395/600 |
| 5,060,144 | 10/1991 | Sipple et al. | 364/200 |
| 5,161,227 | 11/1992 | Dias et al. | 395/650 |
| 5,226,143 | 7/1993 | Baird et al. | 395/425 |
| 5,263,146 | 11/1993 | Mishima | 395/425 |
| 5,263,161 | 11/1993 | Barth et al. | 395/650 |

FOREIGN PATENT DOCUMENTS 0106557 4/1984 European Pat. Off. ..... G06F 13/00
0363882 4/1990 European Pat. Off. ........ G06F 9/46
9102310 2/1991 PCT Int'l Appl. ............ G06F 9/46

OTHER PUBLICATIONS

L. C. Hitch, "Status Save/Restore/Modify Of A Unit of Work", IBM Technical Disclosure Bulletin, vol. 24, No. 8, pp. 4431–4432, Jan. 1982.
R. E. Wagner, "Shared Resource Locking Controls", IBM Technical Disclosure Bulletin, vol. 25, No. 7B, pp. 3762–3764, Dec. 1982.
D. Gawlick, "Lock Processing In A Shared Data Base Environment", IBM Technical Disclosure Bulletin, vol. 25, No. 10, pp. 4980–4985, Mar. 1983.

*Primary Examiner*—Michael R. Fleming
*Assistant Examiner*—Gopal C. Ray
*Attorney, Agent, or Firm*—Lynn L. Augspurger

[57] ABSTRACT

A latch manager enabling multiple processors in a multiprocessor system to gain access to a shared resource. Resource access is controlled by the use of a latch-control word. There is one latch-control word associated with each of the shared resources in the system. The latch-control word can reside either in the shared resource itself or in a separate common area of the system to which each of the processors has access. The latch-control word is captured by the requesting processor and its contents are modified to indicate that the requesting processor owns the latch (either in a shared or exclusive state) or that it is making a request to own the latch at the first opportunity. If the processor was not able to gain ownership of the latch upon its initial capture, the denied processor will wait and monitor the latch until it has been promoted to ownership of the latch. Optionally, the processor can back out of the request and continue processing.

15 Claims, 17 Drawing Sheets

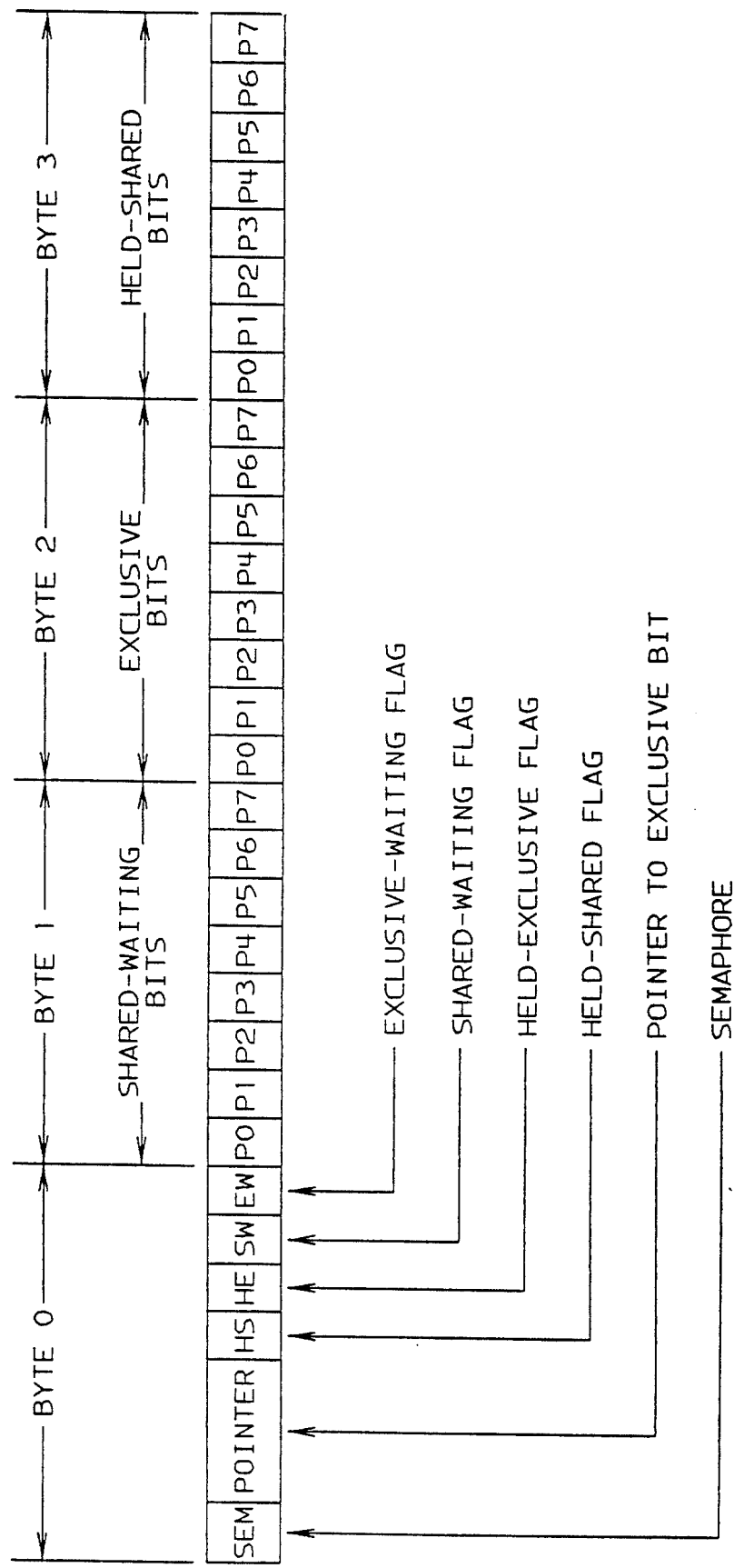

FIG. 2A

CAPTURE LATCH-CONTROL WORD AT ADDRESS SPECIFIED BY ARGUMENT PASSED TO MODULE "SETLCH" *200*

- LATCH NOT HELD (=0) *210*
  - EXCLUSIVE REQUEST (ENTRY POINT IS SETEXC OR SETEXB) *211*
  - SHARED REQUEST (ENTRY POINT IS SETSHR OR SETSHB) *212*
- LATCH IS HELD (LATCH-CONTROL WORD NOT EQUAL TO ZERO) *220*
  - LATCH-CONTROL-WORD STATE IS VALID (CHECKING IS NOT EXHAUSTIVE) *221*
    - LATCH IS HELD BY SOME PROCESSOR OTHER THAN THE REQUESTER
      - EXCLUSIVE REQUEST (ENTRY POINT IS SETEXC OR SETEXB) *230*
        - BACKOUT REQUESTED (ENTRY POINT IS SETEXB)
        - BACKOUT NOT REQUESTED (ENTRY POINT IS SETEXC)
          - LATCH IS HELD EXCLUSIVE *232*
          - LATCH IS HELD SHARED *233*
      - SHARED REQUEST (ENTRY POINT IS SETSHR OR SETSHB) *231*
        - LATCH IS HELD EXCLUSIVE *250*
          - BACKOUT REQUESTED (ENTRY POINT IS SETSHB)
          - BACKOUT NOT REQUESTED (ENTRY POINT IS SETSHR)

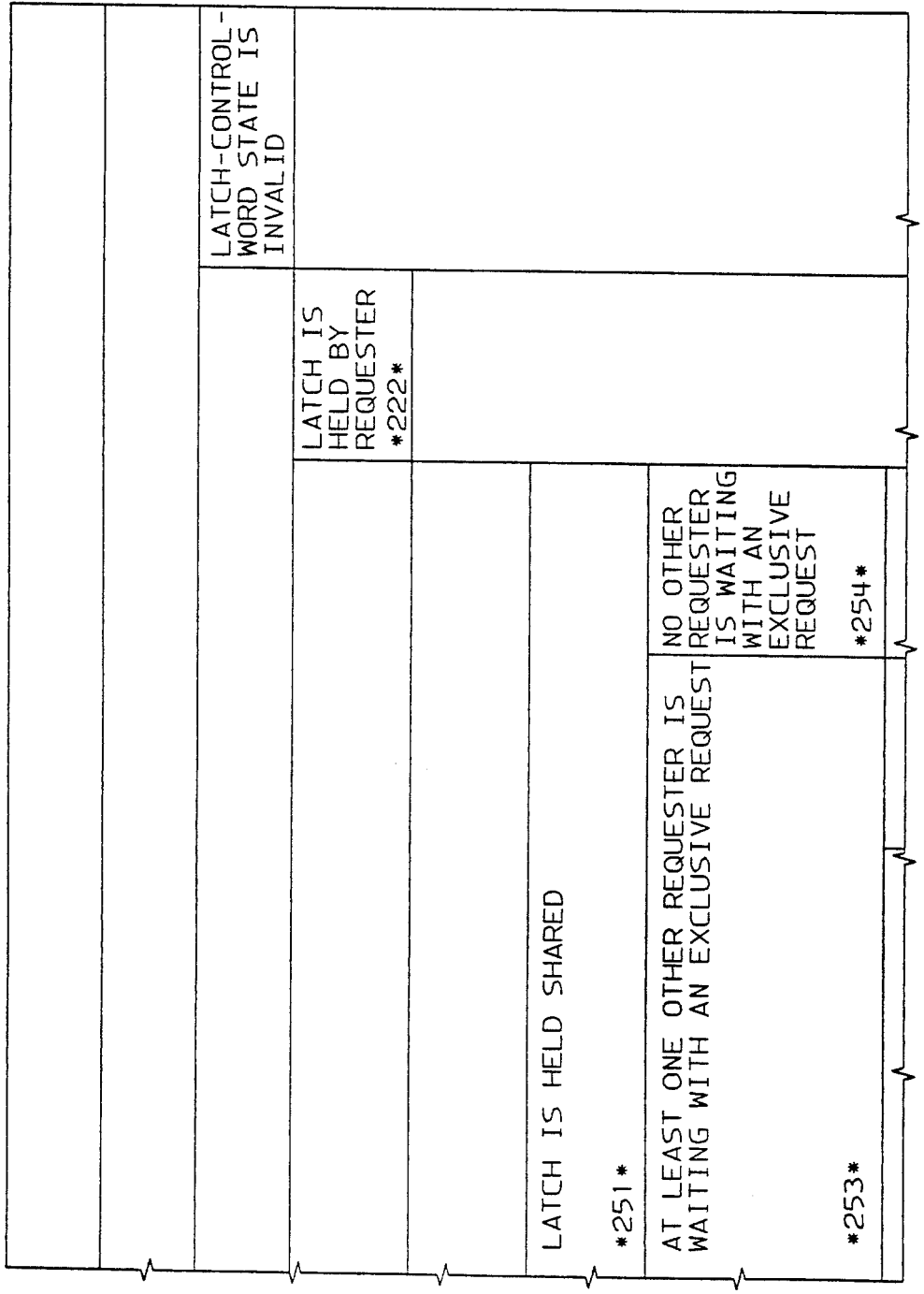

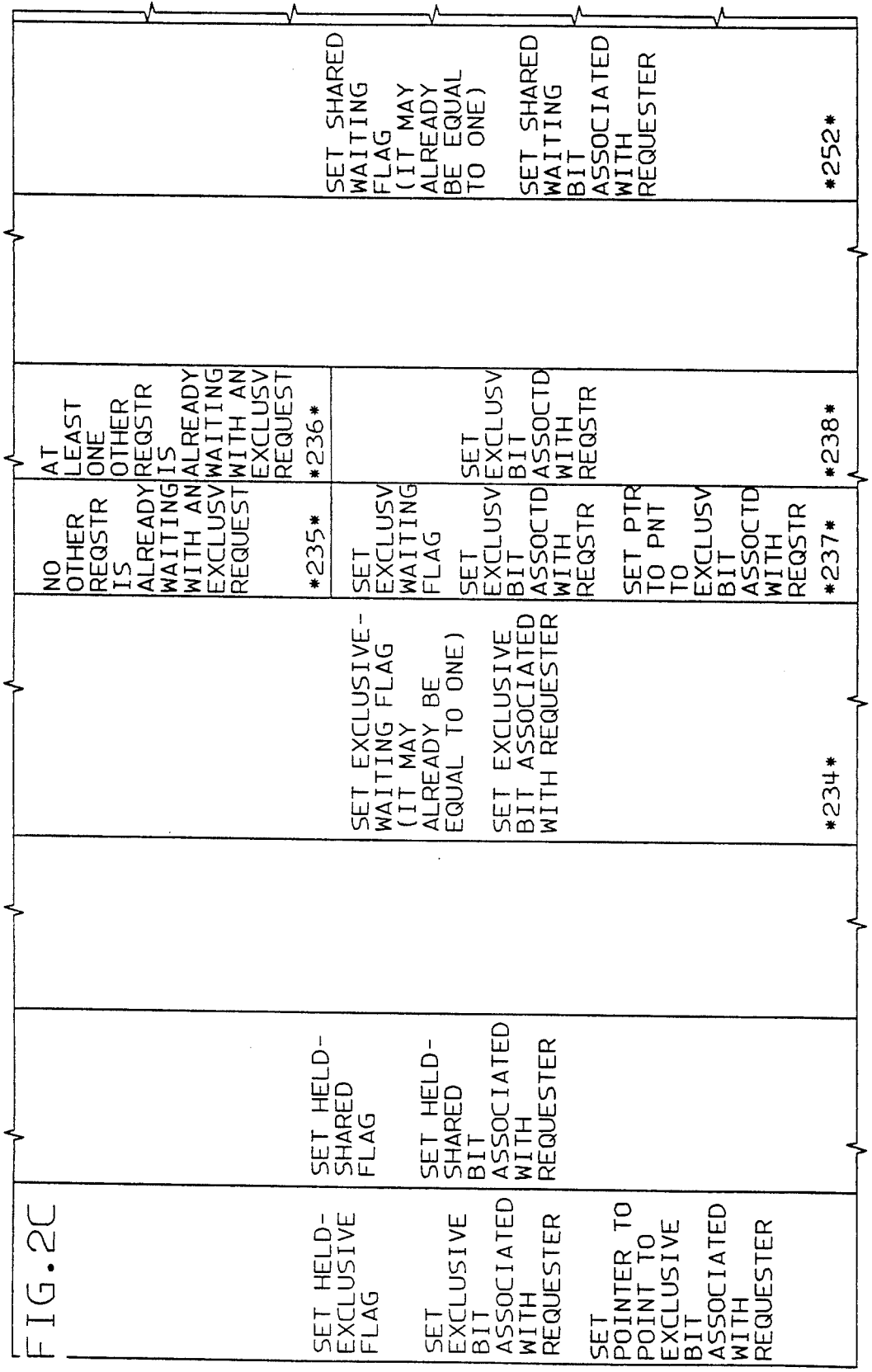

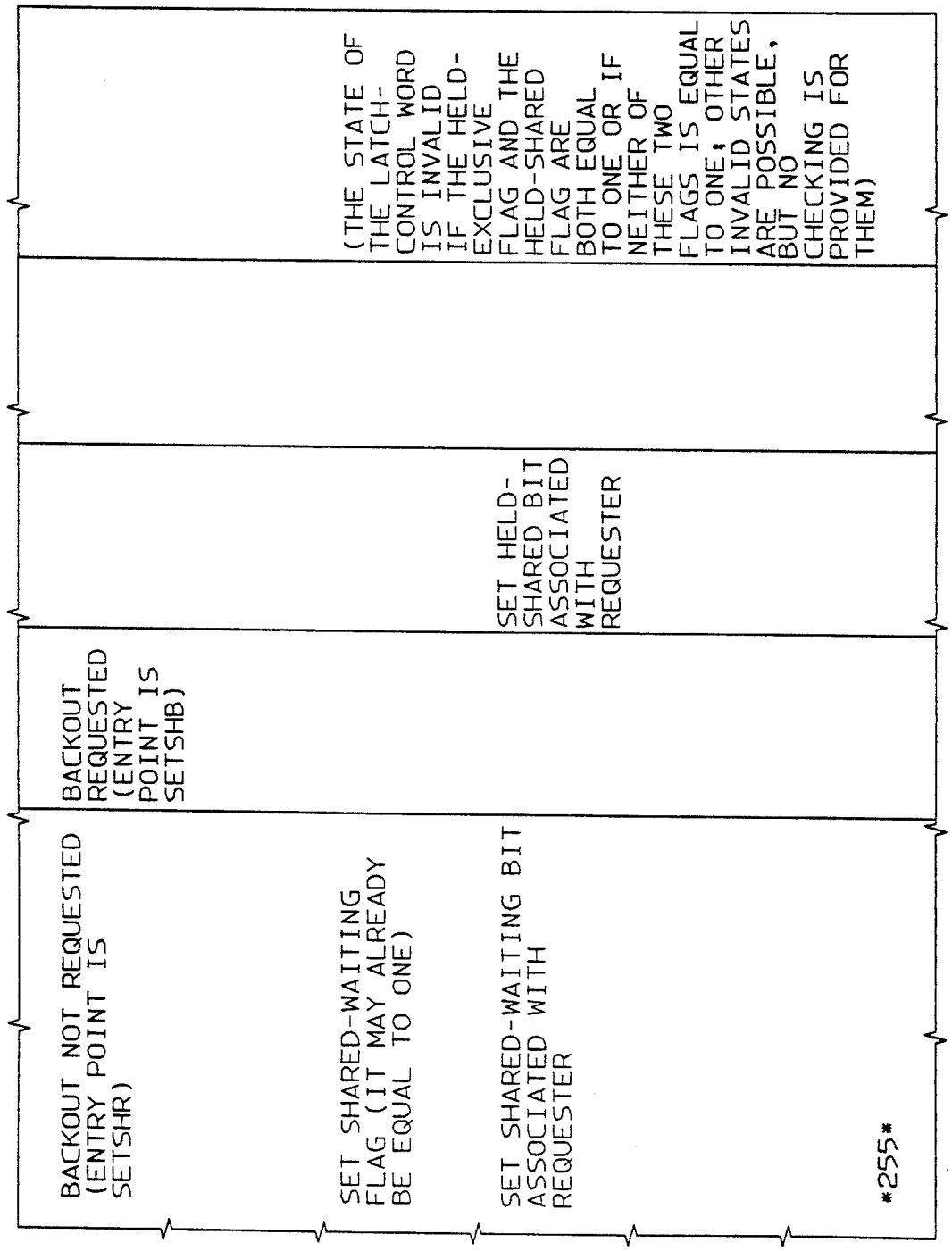

FIG.3A

| CAPTURE LATCH-CONTROL WORD AT ADDRESS SPECIFIED BY ARGUMENT PASSED TO MODULE "RSTLCH" *300* | | | | | | |
|---|---|---|---|---|---|---|
| LATCH-CONTROL WORD IS EQUAL TO REQUESTERS HELD-EXCLUSIVE VALUE *310* | LATCH-CONTROL-WORD IS NOT EQUAL TO REQUESTERS HELD-EXCLUSIVE VALUE *311* | | | | | |
| | LATCH-CONTROL WORD IS EQUAL TO REQUESTERS HELD-SHARED VALUE *320* | LATCH-CONTROL-WORD IS NOT EQUAL TO REQUESTERS HELD-SHARED VALUE *330* | | | | |
| | ZERO OUT ENTIRE LATCH-CONTROL WORD | REQUESTER HOLDS EXCLUSIVE LATCH "340" *340* | | | | |
| | | SHARED REQUEST IS WAITING *341* | | NO SHARED REQUEST IS WAITING *342* | | |
| | | EXCLUSIVE REQUEST IS WAITING *343* | NO EXCLUSIVE REQUEST IS WAITING *344* | ONLY ONE EXCLUSIVE REQUEST IS WAITING *350* | MORE THAN 1 EXCLUSIVE REQUEST IS WAITING *351* | NO EXCLUSIVE REQUEST IS WAITING *352* |

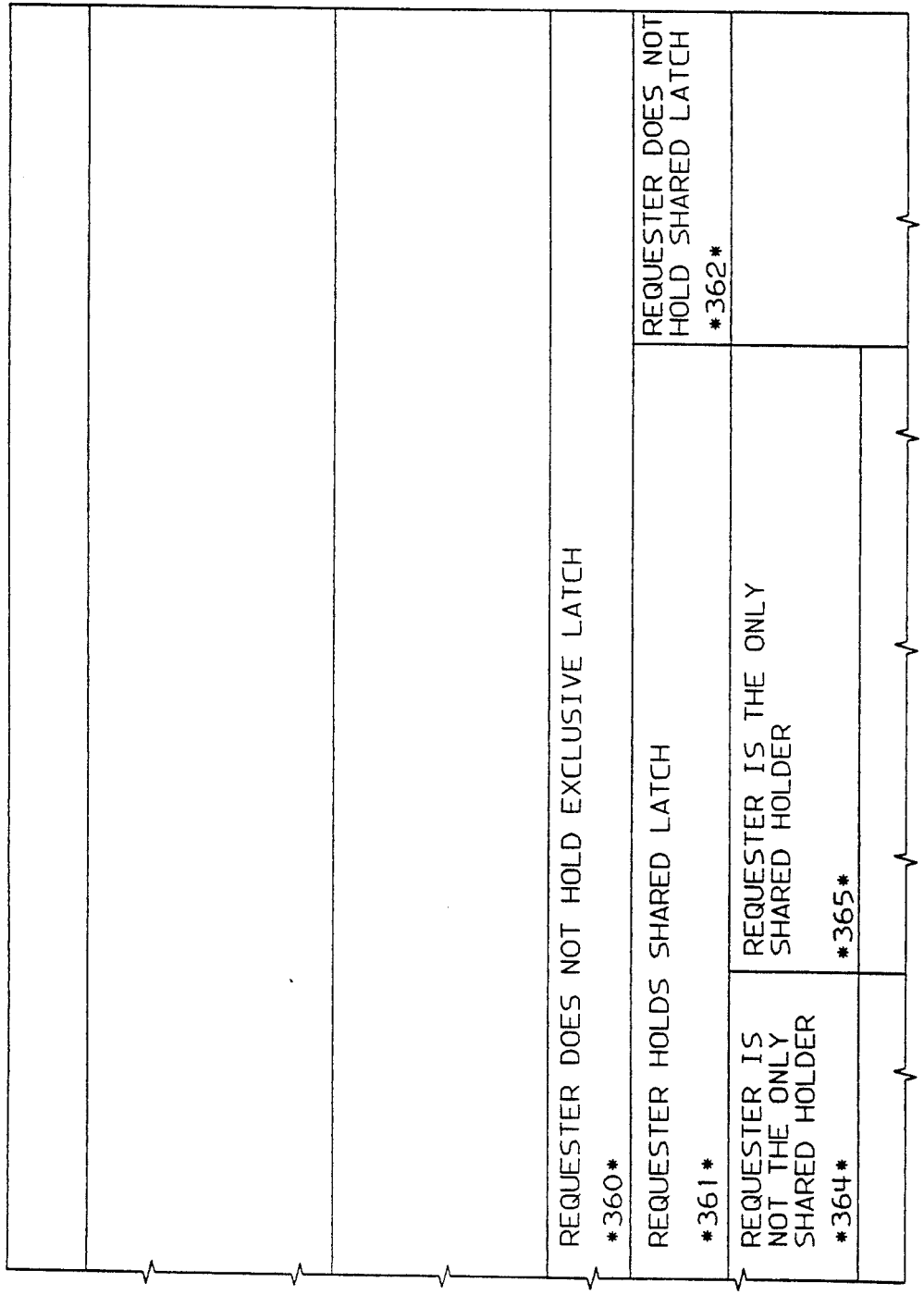

FIG. 3D

| RESET HELD-SHARED BIT ASSOCIATED WITH REQUESTER *366* | RESET HELD-SHARED FLAG *367* RESET HELD-SHARED BIT ASSOCIATED WITH REQUESTER | | |
|---|---|---|---|
| | ONLY ONE EXCLUSIVE REQUEST IS WAITING *368* | MORE THAN ONE EXCLUSIVE REQUEST IS WAITING *369* | NO EXCLUSIVE REQUEST IS WAITING *370* |
| | RESET EXCLUSIVE-WAITING FLAG *371* | | |
| | SET HELD-EXCLUSIVE FLAG (POINTER WAS SET TO THE APPROPRIATE EXCLUSIVE BIT DURING EXECUTION OF "SETLCH" ROUTINE OR DURING AN EARLIER EXECUTION OF THIS ROUTINE) *372* | | RELEASE LATCH-CONTROL WORD RETURN (LATCHING_ERROR) *374* |
| RELEASE LATCH-CONTROL WORD RETURN(RESET_SUCCESSFUL) *373* | | | RELEASE LATCH-CONTROL WORD RETURN (NOT_LATCHED_BY_YOU) *363* |

\*515\*

TIME

\*500\* | 00 | 00 | 00 | 00 |  (THE CONTROL BLOCK IS UNLATCHED)

\*501\* | 00 | 00 | 00 | 00 | → | 10 | 00 | 00 | 00 | → | 34 | 00 | 10 | 00 |
(LM3 CAPTURES AND UPDATES LATCH-CTL WORD)

\*502\* | 34 | 00 | 10 | 00 | → | 10 | 00 | 00 | 00 | → | 36 | 40 | 10 | 00 |
(LM1 CAPTURES AND UPDATES LATCH-CTL WORD)

\*503\* | 36 | 40 | 10 | 00 | → | 10 | 00 | 00 | 00 | → | 36 | 60 | 10 | 00 |
(LM2 CAPTURES AND UPDATES LATCH-CTL WORD)

\*504\* | 36 | 60 | 10 | 00 | → | 10 | 00 | 00 | 00 | → | 36 | E0 | 10 | 00 |
(LM0 CAPTURES AND UPDATES LATCH-CTL WORD)

\*505\* | 36 | E0 | 10 | 00 | → | 10 | 00 | 00 | 00 | → | 00 | 00 | 00 | E0 |
(LM3 CAPTURES AND UPDATES LATCH-CTL WORD)

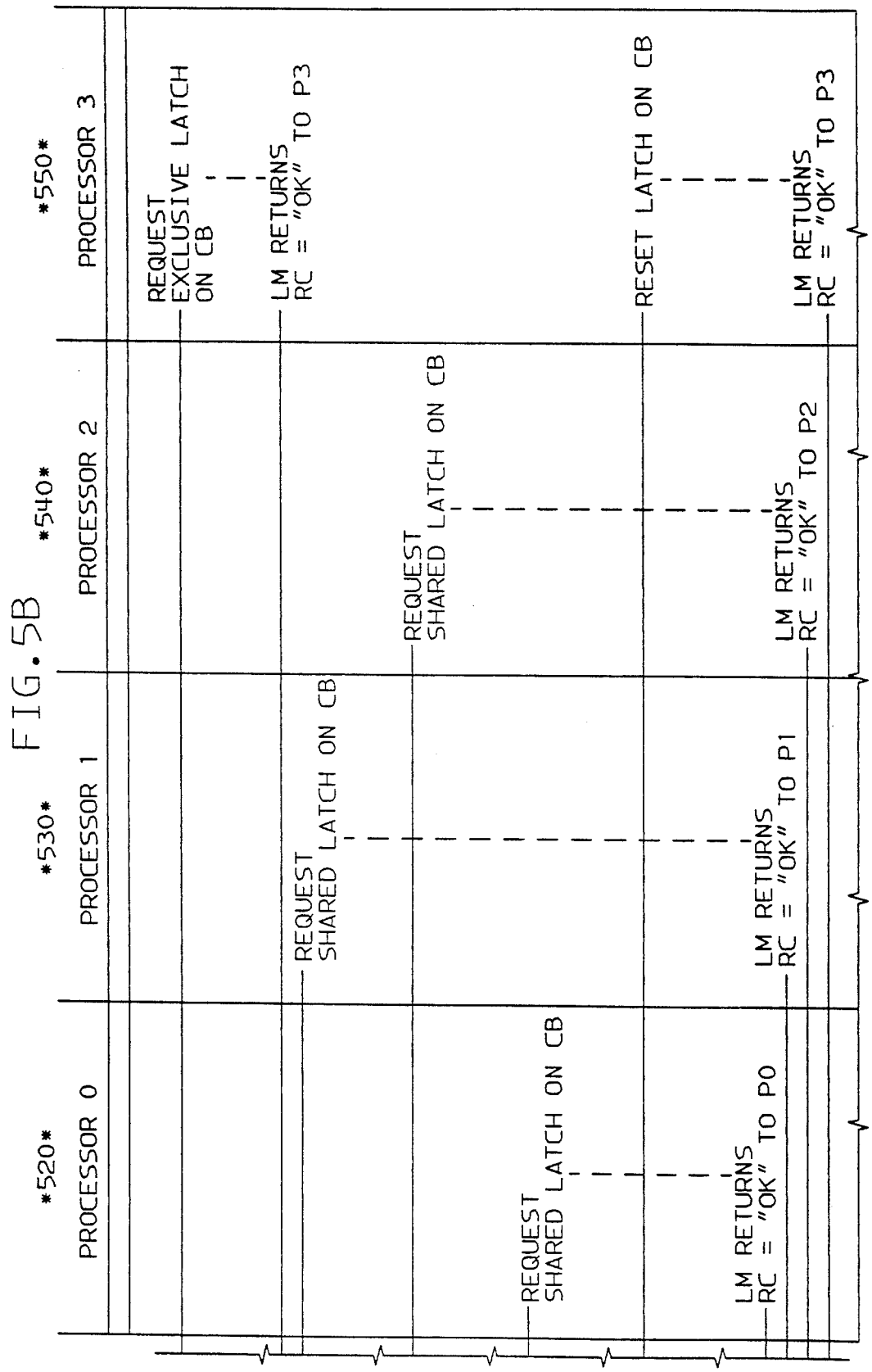

METHOD AND APPARATUS FOR CONTROLLING ACCESS BY A PLURALITY OF PROCESSORS TO A SHARED RESOURCE

FIELD OF THE INVENTION

The present invention relates generally to shared resource access control and more particularly to a latch management design in a multiprocessor environment enabling equal access to shared resources.

BACKGROUND OF THE INVENTION

In a multiprocessing environment it is desirable to use latches, also known as locks, on control structures in order to govern access to the control information which is used by more than one processor. A control structure is typically a control block or a table in main memory, such as the subchannel as defined in the IBM 370-XA architecture. In the case of a subchannel, the control structure acts as the logical representation of a physical device (such as DASD, printers . . . ). The subchannel control block reflects the current status of the physical device. Therefore control of the subchannel control block means control of the physical device. Other types of control structures are associated with data elements or data arrays which reside in main memory of the multiprocessing system.

Some multiprocessing environments allow more than one processor to access control structures in "shared" mode when these processors intend only to read the control structure. A processor which intends to modify the control structure, a write operation for example, must be forced to wait until all of the processors which are currently accessing the control structure in a shared mode, release the control structure. An important aspect of any locking design is that there be no possibility that a processor can be "locked out". To prevent lockouts, a processor which submits a request for access to the control structure must eventually be granted the access it requested.

The amount of space occupied by the latch-control field and the amount of time to process a request for access should be kept to a minimum. Control structures tend to exist in the form of large arrays, and individual elements must be kept as small as possible. Some prior art methods of controlling access to shared structures have involved linked lists of pointers to the requesting processors. These lists are undesirable in that they occupy a great deal of space and also require several machine cycles to process a request.

Furthermore, some processors have a small cache-line size, so that a small latch-control field allows other useful information to be packed into the same line in which the latch-control field is placed. In some locking designs, all of the information needed during normal processing cannot be contained in a single line. This requires more than one read operation (more machine cycles) for a processor to even determine if it can gain access to the control structure.

It is therefore one object of this invention to provide a locking mechanism for shared control structures in a multiprocessor environment.

It is also an object of this invention to allow shared access to common control structures.

It is a further object of this invention to prevent the possibility of a processor being locked out of access to the control structure.

It is another object of this invention to decrease the size of the control words required to manage access to shared control structures.

SUMMARY OF THE INVENTION

The latch manager of the present invention enables multiple processors in a multiprocessor system to gain access to a shared resource. Such systems typically rely on control structures in main memory to manage access to the shared resource. The latch manager is therefore primarily directed to managing processor access to the control structures. The manager will guarantee that each processor will be granted access without the possibility of any of the processors being locked out. Multiple processors can be granted shared access to the resource (read only), while exclusive access will be granted to only a single processor at a time.

The latch manager accomplishes control of resource access by the use of a latch-control word. There is one latch-control word associated with each of the shared resources in the system. The latch-control word can reside either in the shared resource itself or in a separate common area of the system to which each of the processors has access. When a processor wishes to access the shared resource, it "captures" the latch-control word by reading it from the common area, and placing a "dummy" latch-control word in the common area. The dummy word indicates to the other processors in the system that one of the processors is currently updating the latch-control word.

Once the latch-control word has been captured, the contents of the latch-control word are modified to indicate that the requesting processor owns the latch (either in a shared or exclusive state), or that it is making a request to own the latch at the first opportunity, or that it has released the latch. After the latch-control word has been modified, it is stored back into the common area, replacing the dummy control word. Once the control word is back in the common area, it becomes available for capture by the rest of the processors in the system.

If the processor was not able to gain ownership of the latch upon its initial capture, it was because some other processor had exclusive ownership at that particular point in time, or because it requested exclusive ownership while some other processor or processors held the latch in shared mode. At this point, the denied processor will wait and monitor the latch until it has been promoted to ownership through the action of another processor that has released its latch. Optionally, the processor can back out of the request and continue processing.

BRIEF DESCRIPTION OF THE DRAWINGS

FIG. 1 depicts a latch-control word for a shared resource in an eight-processor system.

FIGS. 2A–2F are Nassi-Shneiderman charts for the method of setting the latch-control word.

FIGS. 3A–3D are Nassi-Shneiderman charts for the method of releasing the latch-control word.

DESCRIPTION OF THE PREFERRED EMBODIMENT

Figure 2E:
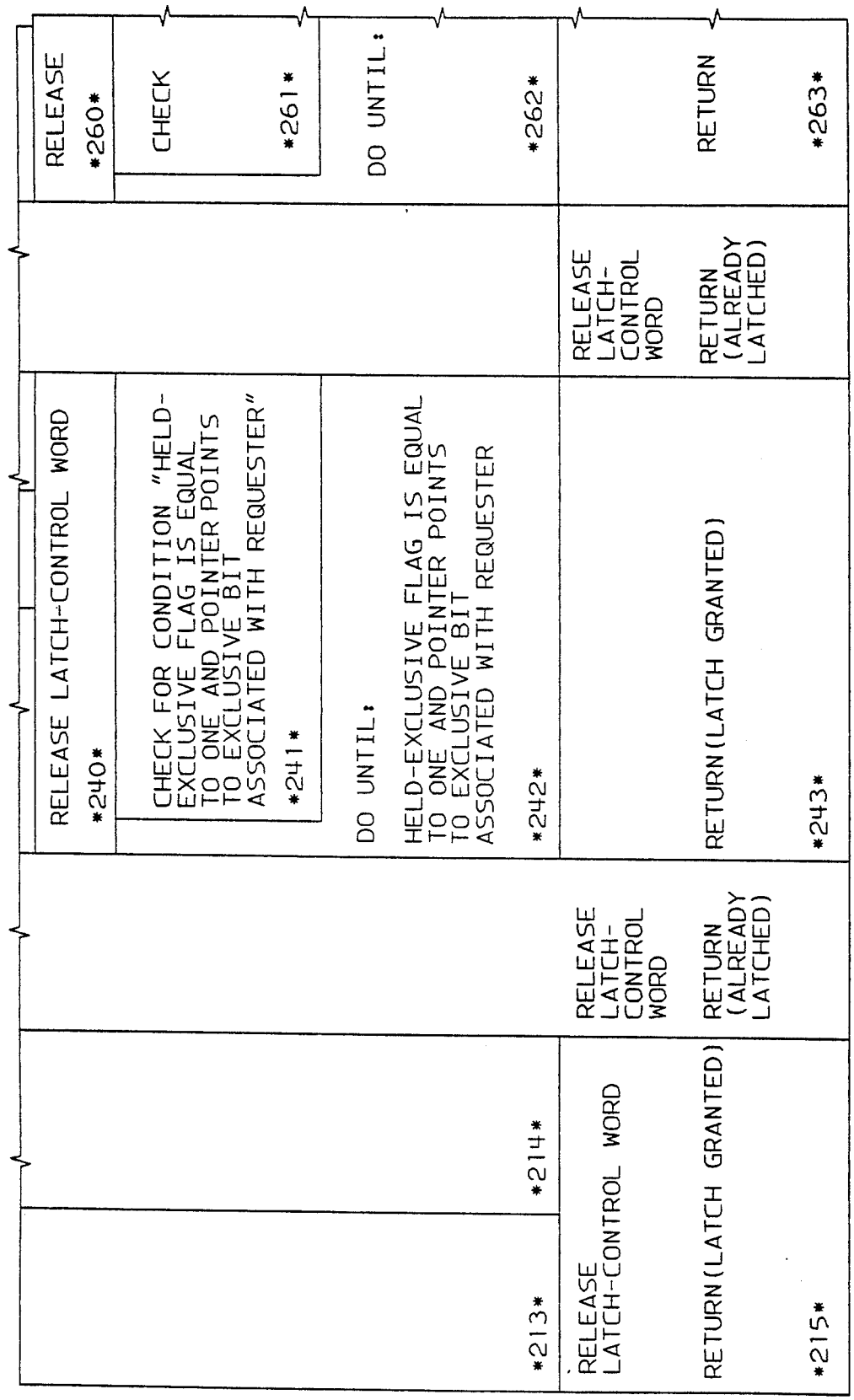

The latch-manager of the present invention allows a plurality of processors to submit latch requests for the same control structure, virtually simultaneously, and guaranteeing that each of the processors will eventually be granted its requested access to the control structure. In the preferred embodiment, the system supports up to eight processors, but the invention is not limited to such a number. The latch manager will prevent any processor which has submitted an access request from being "locked out". In other words, no one processor will ever be left waiting indefinitely while access to the control structure is granted to other processors that happen to be favored because of peculiarities associated with arbitrary priority or the timing or sequence of their access requests.

The latch manager supports multiple "shared-latch" holders. If several processors intend to only read the control structure without modifying it, they are allowed to hold the latch in common at the same time, without each waiting for the other to complete its operation. A processor that intends to modify the control structure must wait its turn, and will obtain exclusive use of the control structure.

The latch manager accomplishes its control of access to a shared resource (control structure) using a latch-control word. There is latch-control word for each of the shared resources in the system. Each of the processors has access to each of the latch-control words. For the preferred embodiment of eight processors, the latch-control word occupies only four bytes. The latch-control word contains all of the status information required to control the access resource. The reduction of the latch-control word to only four bytes is significant for at least two reasons: 1. the path-length through the latch-manager logic is reduced by packing the entire latch-control field into the word size used by the processor for which the latch manager is intended (the Motorola MC88100 microprocessor); and 2. performance of the system is enhanced by reducing the space in the control structure which is taken up by the latch-control field. In the one embodiment of the invention, the memory system employs a cache memory (preferably a Motorola MC88200) whose line size is only sixteen bytes. By packing the latch-control word into four bytes, a full twelve bytes of data remain in the sixteen-byte line, thus saving time by avoiding a second fetch of a sixteen-byte line from storage into the L1 cache whenever a critical set of control information is required. This is significant because the latch-control word is typically a part of the control-structure itself.

The latch-control word of the preferred embodiment is depicted in FIG. 1. As described previously, for an eight-processor design, the latch-control word only occupies four bytes of space (eight bits per byte). Byte 0 contains various flags and a pointer which are used to describe the current status of the resource in question. Byte 1 contains shared-waiting bits, p0 through p7, one for each processor in the system. The shared-waiting bits indicate which, if any, of the processors in the system are waiting for shared access to the resource. Byte 2 contains exclusive bits, p0 through p7, one for each processor in the system. The exclusive bits perform a two-fold function. First, they indicate which (if any) of the processors currently has exclusive access to the resource. Second, the exclusive bits indicate which (if any) of the processors are currently waiting for exclusive access to the resource. Byte 3 contains held-shared bits, p0 through p7, one for each processor in the system. The held-shared bits indicate which, if any, of the processors in the system currently hold shared access to the resource. A more detailed description of the utility of each of these types of bits will accompany the operational description of the system below.

Returning to the description of byte 0, the first bit (from left to right) in this byte is a semaphore bit. This bit is used to indicate whether one of the processors has "captured" the latch-control word. If this bit is set, one of the processors in the system is currently updating the latch-control word, and the data in the rest of the control word should not be relied upon until the word has been been released (i.e. the semaphore bit is reset). The latch manager of the preferred embodiment exploits the MC88100 "xmem" instruction ("exchange register with memory"), which allows a processor to swap the contents of a general-purpose register with the contents of a storage location. The xmem instruction makes it possible for the latch manager to "capture" a latch-control field by replacing it with a "dummy" value that other processors in the system recognize as a place-holder for the real latch-control field.

The next three bits in byte 0 of the latch-control word are a pointer to one of the exclusive bits in byte 2 of the latch-control word. This pointer is used to indicate which exclusively, or which processor will be the next one to gain exclusive use of the resource. In the preferred embodiment of the present invention (with eight processors), the pointer is three bits long in order to accommodate the eight exclusive bits in byte 2 (each corresponding to one of the eight processors in the system). A more detailed description of the use of the pointer will accompany the operational description of the system below.

The remaining four bits of byte 0 are four flags which indicate the current status of the shared resource. The first flag, hs (held-shared), is a flag which indicates that the resource is currently held in shared mode by one or more of the processors in the system. Shared mode with respect to a common control structure means that the processors accessing the resource are doing so on a Read-Only basis, i.e. they are not altering (writing to) the control structure. Conversely, the next flag, he (held-exclusive), indicates that the resource is currently held exclusively by one of the processors in the system. Exclusive mode means that only one processor has access to the control structure until it gives up its exclusive control. No other processor in the system can gain access to the resource until the exclusive hold is relinquished. The he flag must be used in conjunction with the pointer and the exclusive bits described above, in order to determine exactly which processor has exclusive control over the resource. The interrelationship of the held-exclusive flag, the pointer and the exclusive bits will become apparent in conjunction with the example given below.

The next flag bit in byte 0, sw (shared-waiting), indicates that one or more processors has requested and is waiting to gain access to the resource in a shared mode. This flag must be used in conjunction with the shared waiting bits described above in order to determine which processors are waiting to share the resource. The final flag in byte 0, ew (exclusive-waiting), indicates that one or more of the processors in the system is currently waiting to gain exclusive access to the resource.

This flag will be set when one of the processors desires exclusive access and the resource is already held by one or more of the other processors (either exclusively or shared). The exclusive bits described above will indicate which of the processors are waiting to hold the resource exclusively when the ew flag is set. In this manner, the exclusive bits will perform a two-fold function, they will first indicate which processor currently has exclusive control over the resource (in conjunction with the pointer when the he flag is set), and secondly the exclusive bits will indicate which of the processors are waiting for exclusive access when the ew flag is set.

Figure 4A:
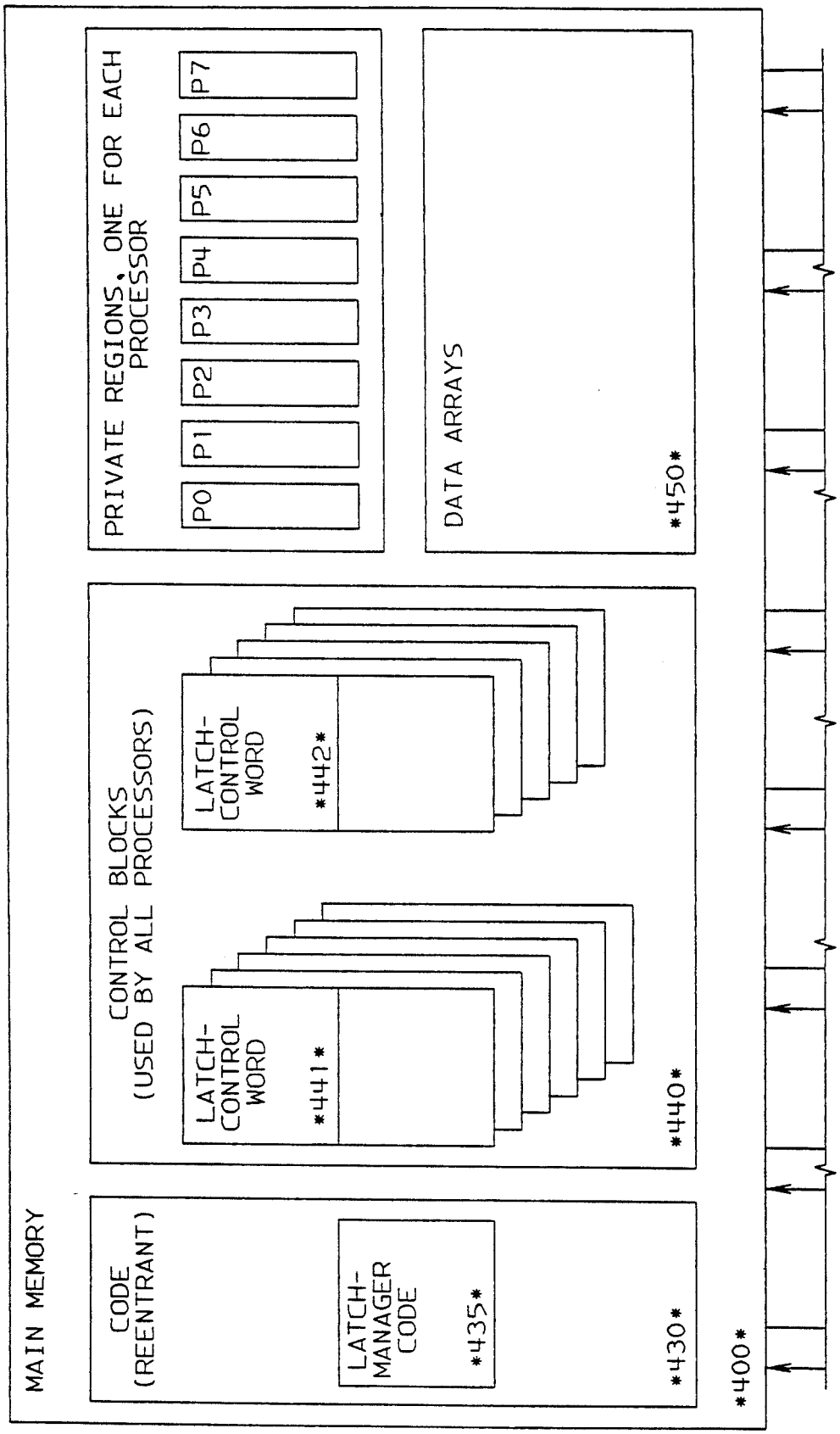
FIGS. 4A–4B illustrate an eight-processor system incorporating the present invention.
Figure 4B:
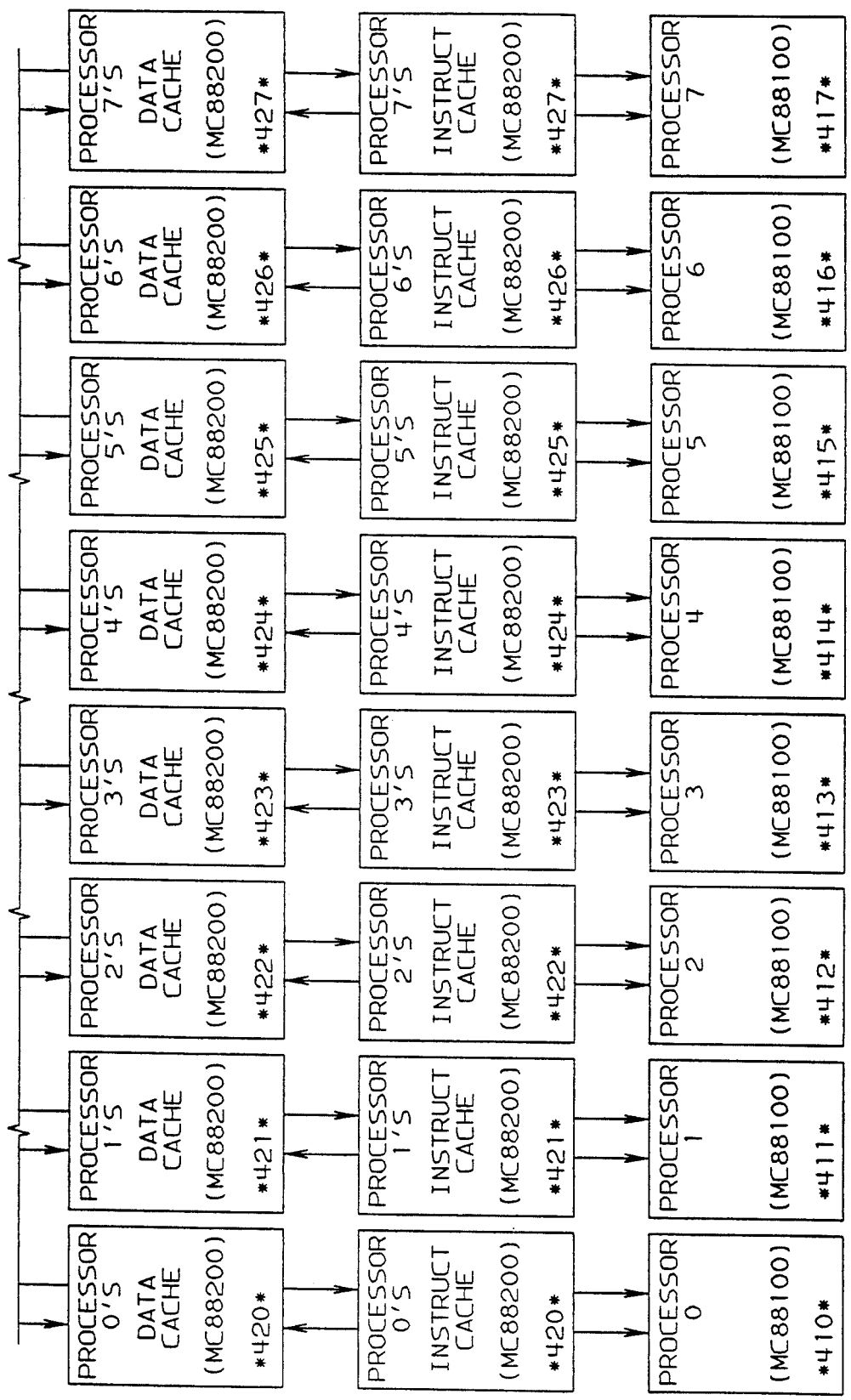

FIGS. 4A–4b depict a data-processing system with eight processors which incorporates the features of the present invention. The eight processors, 410–417, each have separate cache memories, 420–427, between the processors and main memory, 400. There are several elements depicted as residing in main memory. One section of memory is dedicated to reentrant code, 430, part of which is the latch manager code, 435. When any processor wishes to execute any of the latch manager code, it is downloaded from main memory (or its personal cache, if a copy of the code has already been loaded into the cache).

Element 440 in main memory represents control blocks (or control structures) which are used by the system to control the operation of resources which are common to all of the processors. For each of the control blocks (not specifically shown in FIG. 4) there exists one latch-control word (441, 442 for example). The latch-control words (441, 442) have the format previously described with respect to FIG. 1, and control the processors' access to the control blocks. The latch-control words (441, 442) have been depicted as residing in the same area of memory as the control blocks, and can even be part of the control block itself.

Some examples of shared resources governed by control blocks would be a arrays of data, 450, also residing in main memory, 400.

OPERATIONAL DESCRIPTION

The operation of the latch manager can be separated into two essential functions. First, an operation called setlch is used to latch a control structure; and second, a function called rstlch, is used to unlatch the control structure. These two functions operate on a latch-control word that has a particular format such as the one described above. The operation of the two functions, setlch and rstlch, are depicted in the two Nassi-Shneiderman diagrams illustrated in FIGS. 2 and 3 respectively.

In the diagrams showing the design of the two functions setlch and rstlch, the terms "capture latch-control word" and "release latch-control word" are used. The semaphore bit, bit 0 of byte 0 of the latch-control word, is used to indicate whether or not the latch-control word is available for capture by the requesting processor. The semaphore bit may be either a 0 or a 1. If the semaphore bit is 0, then the latch-control word is available for "capture". If the semaphore is 1, then the latch-control word is unavailable for capture because it has already been captured by a processor which is in the process of modifying it. A latch-control word is preferably captured by use of the "xmem" instruction described above. The xmem instruction is issued by the requesting processor until the semaphore bit in the latch-control word is equal to zero (i.e. the control word is available for capture). As part of the capture of the latch-control word, the xmem instruction swaps the control word with a "dummy" control word, such as '80000000'. The dummy control word can have any value so long as the left-most bit is equal to 1, indicating the requesting processor has captured and is updating the latch-control word. Once the requesting processor has updated the latch-control word with an updated status (e.g it is waiting for exclusive control), the latch-control word is released when it is stored back in memory at the location from which it was taken by means of the xmem instruction, overwriting the dummy value. Upon release, the semaphore bit of the updated latch-control word will be equal to a 0, to indicate that the control word is available for capture by one of the other processors in the system.

Figure 2F:
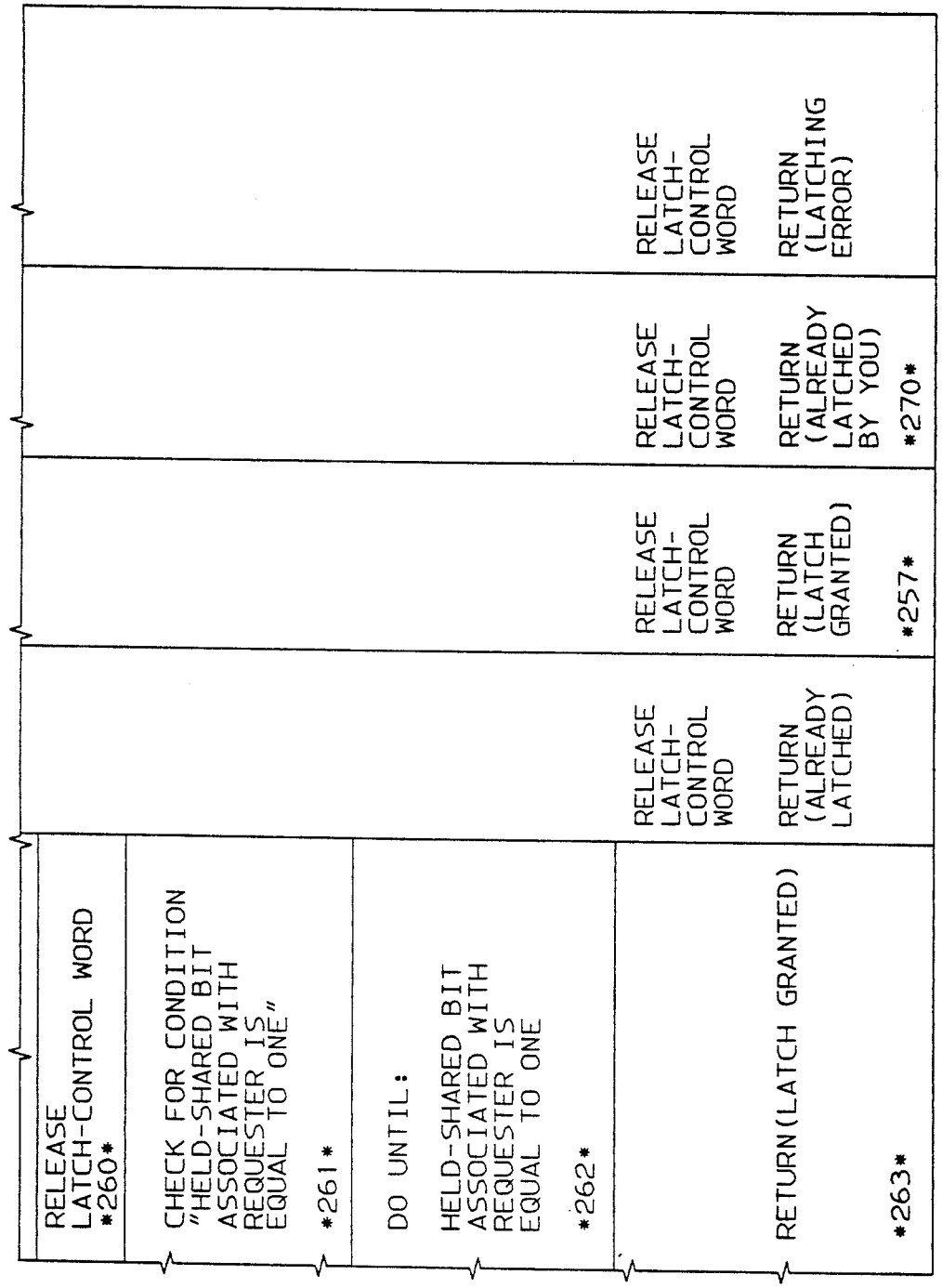

Turning to the Nassi-Shneiderman chart of the design of the function setlch depicted in FIG. 2, it can be seen that the first operation, 200, is to capture the latch-control word as described above. In the preferred embodiment of the latch manager, the function setlch is invoked with a single argument: the latch-control word address.

Once the latch-control word has been captured by the requesting processor, the next operation is to determine if the latch (i.e. the resource) is held by another one of the processors in the system. In this discussion, the word "held" will be used in conjunction with both the latch and the common control structure or resource. If a processor "holds" the latch, it necessarily also "holds" the control structure (resource). The latch is in essence the gateway to the control structure which controls access to the resource. The determination as to whether the latch is currently held or not is performed in boxes 210 and 220 in the chart. All of the determinations referred to in this discussion are performed by an examination and testing of the flags and bits in the latch-control word.

In the simplest case (210–215) the latch is not held by any of the processors in the system, and the requesting processor can gain whatever access it desires. In order to provide the fastest possible execution of the latching function, special entry points called setexc ("set exclusive", if exclusive access is desired), setexb ("set exclusive, back out if already held"), setshr ("set shared", if shared access is being requested), and setshb ("set shared, back out if already held") can been included in the setlch function. These special entry points into the setlch function save the requesting processor the trouble of including a second argument for the type of request (which would cost at least one cycle), and it saves the function setlch the trouble of looking for an active "shared versus exclusive" flag in that second argument, an operation that might cost several more cycles.

If the latch is not held by any of the other processors in the system (210) and the requesting processor desires exclusive access (211), then the requesting processor will cause the latch-control word to be modified in several ways (213). First, the held-exclusive flag, he, will be set. This informs any other processor reading the latch-control word that the latch (the resource) is held exclusively. The second modification performed on the latch-control word is to change the pointer in byte 0 to point to the exclusive bit associated with the requesting processor. For example, if the requesting processor is processor 3, then the pointer will be set to a value of 011 hex in order to point to the exclusive bit for processor 3. The final modification to the latch-control word is to set the exclusive bit associated with the requesting processor. Following the previous example of processor 3, bit 3 of byte 2 (see FIG. 1) would be set, indicating that processor 3 has exclusive control of the latch (the resource). After the modifications to the latch-control word are performed, the latch-control word is released, and the processor is informed that the access has been granted (215). The process of releasing the latch-control word consists of simply storing the modified latch-control word back in memory, replacing the dummy latch-control word placed in memory during the capture of the control word.

If the latch is not held by any of the other processors in the system (210) and the requesting processor desires shared access (212), then the requesting processor will cause the latch-control word to be modified in two respects (214). First, the held-shared flag, hs, will be set. This informs any other processor reading the latch-control word that the latch (the resource) is held in a shared mode. The second modification performed on the latch-control word in this case is to set the held shared bit associated with the requesting processor. For example, if the requesting processor was again processor 3, bit 3 of byte 3 (see FIG. 1) would be set, indicating that processor 3 has shared access to the resource. As with the case where exclusive access was sought, after the modifications to the latch-control word are performed, the latch-control word is released, and the processor is informed that shared access has been granted (215).

In box 220, it has been determined that the latch is held by one or more of the processors in the system. The next test (221, 222) determines who owns the latch. If the latch is already held by the requesting processor (222), then the latch-control word is simply released and the processor is informed that it already has access (270).

If the latch is held by another processor (221), the next test determines what kind of access has been requested (230, 231). If the requesting processor desires exclusive access to the resource (230), then the requesting processor is destined to wait in order to gain the requested access. The first determination performed in this situation is to test the latch-control word in order to determine how the latch is currently held (232, 233). When the latch-control word indicates (232) that the latch is already held exclusively by one of the other processors, two modifications (234) are performed to the latch-control word. First, the exclusive-waiting flag, ew, is set (234) in order to indicate that the requesting processor is waiting for exclusive access (Note: the ew flag might have already been set by one of the other processors which is already waiting for exclusive access. In this case, the requesting processor does not have to set the ew flag once again). The second modification is to set (234) the exclusive bit associated with the requesting processor in byte 2 of the latch-control word. The setting of the exclusive bit, in this case, is to indicate that the requesting processor is waiting for access to the resource (as opposed to the setting of the same exclusive bit in block 213 which indicated, in conjunction with the he flag and pointer of byte 0, that the processor currently holds the latch exclusively).

If the latch is held by another processor (221), the requesting processor desires exclusive access to the resource (230), and the latch is already held in a shared mode (233), then a test is performed in order to determine if any of the other processors in the system are currently waiting for exclusive access (235, 236). If no other processors are waiting for exclusive access (235), several modifications (237) are performed to the latch-control word. First, the exclusive-waiting flag, ew, is set (237) in order to indicate that the requesting processor is waiting for exclusive access. A second modification (237) is to set the exclusive bit associated with the requesting processor in byte 2 of the latch-control word. A third modification (237) to the latch-control word is to modify the pointer in byte 0 to point to the exclusive bit associated with the requesting processor. The pointer is changed to point to the exclusive bit of the requesting processor, so that the next time exclusive access is granted, the processor currently requesting exclusive access will be granted such access first.

If the latch is held by another processor (221), the requesting processor desires exclusive access to the resource (230), the latch is already held in a shared mode (233) and at least one other processor is already waiting with an exclusive request (236), only one modification (238) is performed to the latch-control word. The only modification required in this case is to set the exclusive bit associated with the requesting processor in byte 2 of the latch-control word. The exclusive-waiting flag, ew, does not have to be set because it has already been set by the previous processor which was made to wait. Furthermore, the pointer in byte 0 is not updated because it is currently pointing to the first processor waiting for exclusive access.

In the above situation, where the requesting processor desires exclusive access and the latch is already held by another processor, the latch-control word will have been modified (234, 237 or 238) in order to indicate that the requesting processor is waiting for exclusive access. After the latch-control word has been modified, it is released (240) back to the common storage area as described above. Once the latch-control word has been modified and released, the processor's access request will not be granted until (241, 242) two conditions in the latch-control word have been satisfied: 1. the held-exclusive flag, he, has been set; and 2. the pointer in byte 0 points to the exclusive bit associated with the requesting processor.

The actual updating of the he flag and the pointer will occur in the function rstlch which will be described later. It will suffice for now, to know that when a processor gives up its hold on the resource, the latch-control word is updated to reflect the new status of the latch (resource). Once the two conditions described above have been met, the processor is granted (243) its exclusive access to the resource.

Returning to the point in FIG. 2 at block 231, it has been determined that the latch is held by some processor other than the requestor (221), and that the requestor desires shared access to the resource (231). The next test (250, 251) determines how the latch is currently held. When the latch-control word indicates (250) that the latch is held exclusively by one of the other processors, two modifications (252) are performed to the latch-control word. First, the shared-waiting flag, sw, is set (252) in byte 0 in order to indicate that the requesting processor is waiting for shared access. The second modification is to set (252) the shared waiting bit associated with the requesting processor in byte 1 of the latch-control word. The shared waiting bit, will indicate that this particular processor is waiting for shared access to the resource.

Once the latch-control word has been modified to reflect the waiting status of the requesting processor, the word is released (260) back to common storage. The processor's shared access request will not be granted until (261, 262) the held shared bit associated with the requesting processor is set in byte 3 of the latch-control word. This bit will be set by one of the other processors in the system when it releases its control of the resource (control structure). Once the held shared bit associated with the processor is set, the processor will be granted (263) shared access to the latch.

After block 231, if it has been determined (251) that the latch is currently held in a shared mode, a further test is performed (253, 254) to see if any other processors are waiting for exclusive access to the resource. If the latch-control word indicates (253) that another processor is waiting for exclusive access, then two modifications are performed to the latch-control word. First, the shared-waiting flag, sw, is set (255) in byte 0 in order to indicate that the requesting processor is waiting for shared access. The second modification is to set (255) the shared waiting bit associated with the requesting processor in byte 1 of the latch-control word. The shared waiting bit, will indicate that this particular processor is waiting for shared access to the resource. These modifications are the same as those performed in block 252, because if another processor is already waiting for exclusive access when the current processor makes its shared request, the processor which made the exclusive request first, must be given priority. As with the procedure following block 252, the procedure following block 255 is to wait (261) until the held shared bit for the requesting processor is set, and then access will granted (263) once this bit is set.

If no other processor was waiting for exclusive access when the current processor made its shared request (254), it means that the processor can immediately be granted its shared access. The only thing needed to accomplish this grant (with respect to the latch-control word) is to set the shared held bit associated with the requesting processor, and release the latch-control word, thus granting the access (257).

RSTLCH OPERATION

Figure 3C:
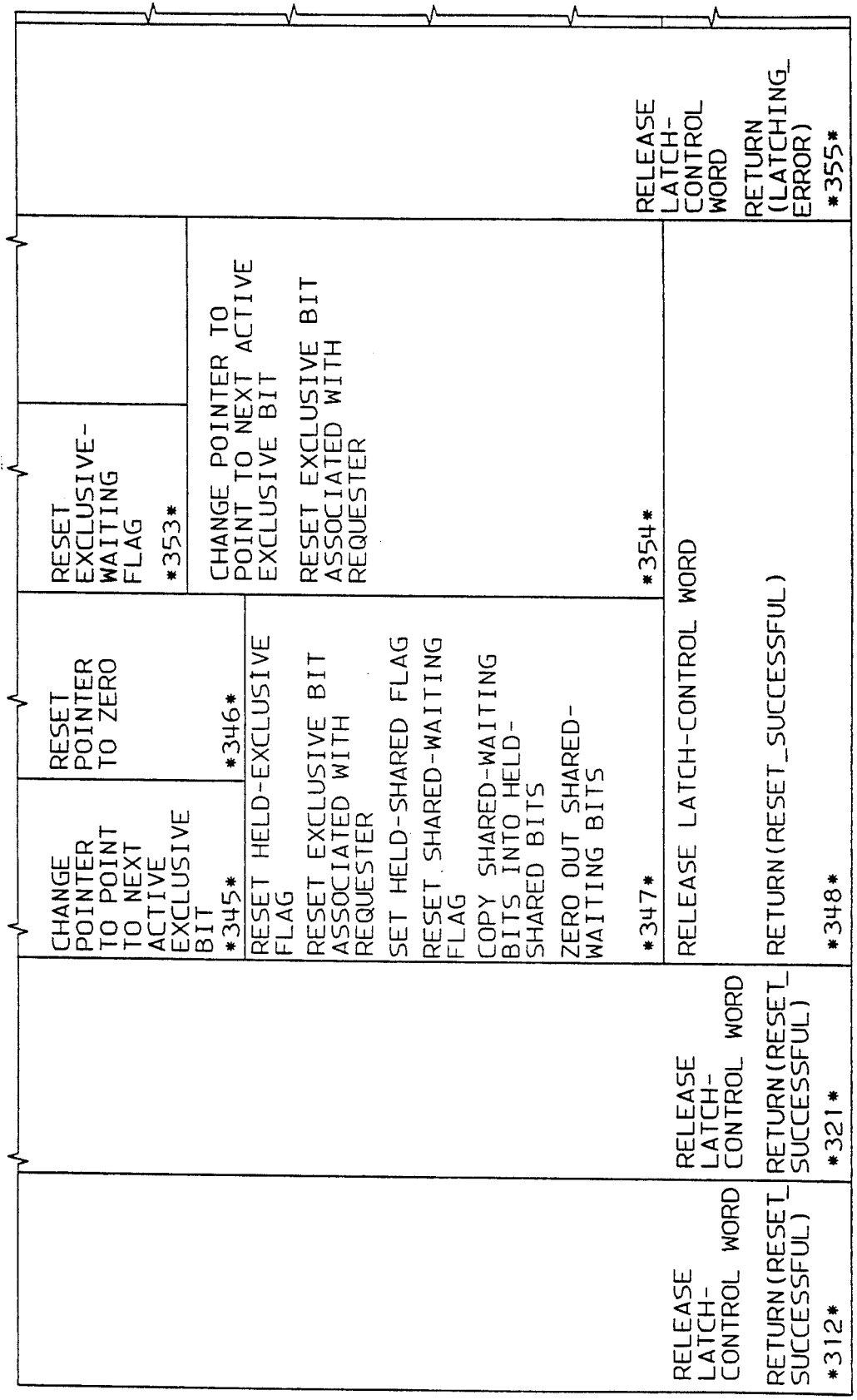

The above description with respect to the function setlch related to the operation of the present invention when a processor requests access to the shared resource. The function rstlch, to be described here, controls the operation of the system when a processor has finished its current access, and a determination has to be made as to which processor(s), and which type of access, will be granted next. The function rstlch has the task of removing from the latch-control word the indication that the processor owns the latch (resource). The releasing of the latch may involve "promoting" one or more waiting processors to the status of latch holder. The Nassi-Shneiderman chart for the function rstlch is depicted in FIG. 3.

As with the function setlch, the first operation performed by rstlch is to capture (300) the latch-control word. The specific operation of using the semaphore bit and the dummy control word has been described above with respect to setlch and will not be repeated here. The next operation performed when a processor is giving up control of the resource is to determine (310, 311) if the current processor has exclusive control of the resource and if any other processors are waiting for the latch. If no other processors are currently waiting, and the processor is giving up exclusive control (310), the latch-control word will simply be zeroed out and released (312). Specifically, the he flag, the pointer, and the exclusive bit associated with the processor (in byte 2) will all be reset. The zeroing out of the latch-control word indicates that no processor is currently accessing the resource and that no processor is waiting for access.

In box 320, it has been determined that the current processor holds the resource in a shared mode, no other processor shares the access and no other processor is waiting for access. In this case, 320, as with the prior case 310, the only operation performed on the latch-control word is to zero out (321) and release the latch-control word. Again, a zeroed out latch-control word indicates that the resource is completely available for access by any of the processors.

If the status of the latch-control word forces the operation into box 330, then the resource is not completely available and the latch-control word cannot simply be zeroed out. In boxes 340 and 360 is determined whether the processor is giving up exclusive access (340) or shared access (360). If the processor is giving up exclusive access (340), the next determination is whether one of the other processors is waiting for shared access (341, 342). This determination is made by examining the sw flag in byte zero. If some processor is waiting for shared access 341, it must further be determined if any other processor is also waiting for exclusive access (343, 344). If another processor is also waiting for exclusive access (343) (determined by examination of the ew flag in byte 0) then several modifications must be performed to the latch-control word. The first modification to the control word is to change (345) the pointer in byte 0 to point to the next processor which is waiting for exclusive access. This is accomplished by looking at the exclusive bits in byte 2 of the control word. The processor which is next highest in number (from the one giving up exclusive access) and has its exclusive bit set, will be the one to which the pointer will now point. This is essentially a round robin scheme for granting exclusive access. One drawback of this method of prioritization (as opposed to a first-in-first-out approach) is that a second processor which requested exclusive access at a later time than a first processor, might be granted the access sooner than the first processor. The advantage of the round robin method is that no processor will ever be locked out of access. Take for example a situation where processor P3 currently has exclusive access. Suppose processor P1 requests exclusive access at time T1 and that processor P5 also requests exclusive access at a later time T2. When P3 gives up its exclusive access, the pointer will be changed to point to P5 because P5 was the next highest processor with its exclusive bit set. When processor P5 is eventually granted and gives up its exclusive access, processor P1 will be the next processor to be given exclusive access (assuming processors P6, 7, 8 and 0 did not intervene with similar exclusive requests. If processors P2-4 intervene with exclusive requests, they will not be granted access prior to P1).

The next modification to the latch-control word is to reset (347) the he flag in byte 0, indicating that the resource is no longer exclusively held. The exclusive bit associated with the current processor is also reset (347). In order to grant the shared access to the processors which have been waiting for such access, several modifications are performed to "promote" these processors to latch holders. First, the held shared flag, hs, in byte zero is set (347). Second, the shared-waiting flag, sw, in byte zero is reset (347). Third, byte 1, which contains the shared waiting bits, is copied (347) into byte 3. This now indicates that the processors with their respective held shared bits set now hold the resource in a shared mode. Finally, the shared waiting bits in byte 1 are zeroed out since each of the processors which was waiting is now a latch holder. Referring back to blocks 261 and 262 of the setlch function (FIG. 2), this is the point in rstlch where the conditions needed to satisfy the waiting condition are met. As stated previously, the processors which are waiting for access look for condition changes in the latch-control word status. These condition changes occur when one of the processors gives up control and "promotes" the other processors to the status of latch holder as described above. After the latch-control word has been modified to effectively promote the waiting processors to shared latch holders, the latch-control word is released (348) so that the other processors can be informed of the updated status.

If the processor is giving up exclusive access (340), at least one shared request is waiting (341), and no other exclusive requests are waiting (344), then the pointer in byte zero must be zeroed out (346). The pointer is zeroed out because there are no processors waiting with exclusive requests. In this situation, the same modifications to the latch-control word described in box 347 are performed to promote the processors waiting for shared access to the status of latch holders.

Returning to block 340 where the processor is giving up exclusive access, the other condition can be that there are no other processors waiting for shared access (342). If this is the case (342) then at least one other processor must be waiting for exclusive access (350, 351). If no other processor is waiting for exclusive access (352) then there has been some sort of error, and the latch is released and the error reported (355). If more than one processor is waiting for exclusive access (351) then two modifications are performed (354) to the latch-control word. First, the pointer is changed (354) to point to the next active exclusive bit (as previously described), and second, the exclusive bit associated with the processor giving up its access is reset (354). If only one processor is waiting for exclusive access, then a further modification (353) to the latch-control word must be performed in addition to the steps described in 354. In 353, the exclusive-waiting flag, ew, is reset. These particular modifications (353, 354) will act to promote the waiting processor to the status of exclusive latch holder. Again, once the modifications to the latch-control word have been completed, the latch-control word is released back to common memory where it can be read by all of the processors.

In block 360 it has been determined that the processor is not giving up exclusive access, and must therefore currently have shared access (361). If the latch-control word indicates (362) that the processor does not have shared access, then there must have been an error, and the latch-control word is released and the error reported (363). The latch-control word is tested (364, 365) to see if there are any other processors currently sharing the resource. If other processors currently share the latch (364), then the only modification to the latch-control word is to reset the held shared bit associated with the processor giving up the access (366). This modification will inform the other processors examining the latch-control word that this processor no longer holds the latch in a shared mode. After the modification is complete, the latch-control word is released (373).

If the processor is giving up shared access (361) and it is the only processor currently holding the latch in a shared mode (365), then two modifications (367) have to be performed to the latch-control word. First, the held-shared flag of byte 0 needs to be reset, and second, the held shared bit associated with the processor is also reset (367). These two modifications effectively remove the current processor as a shared latch holder. The next set of tests (368, 369, 370) determine which processors need to be promoted to exclusive latch holder. If there are no exclusive requests waiting (370), then there has been some sort of error and the latch is released (374) and the error reported (374). If only one exclusive request is waiting (368) then the exclusive-waiting flag in byte zero must be reset (371). This flag is reset because the waiting processor will be promoted to latch holder and there will be no other processors waiting for exclusive access. The only other modification to the latch-control word is to set the held-exclusive flag in byte zero (372). The pointer in byte zero was modified during some previous operation of setlch or rstlch, and does not need to be modified again at this time. Once the modifications to the latch-control word have been completed, the latch-control word is released (373).

OPERATIONAL EXAMPLE

Figure 5:
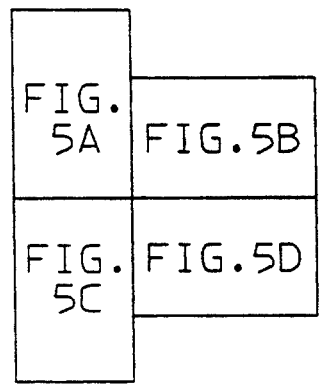
FIGS. 5A–5D depict an operational example of a latching scenario involving a four-processor system.
Figure 5A:
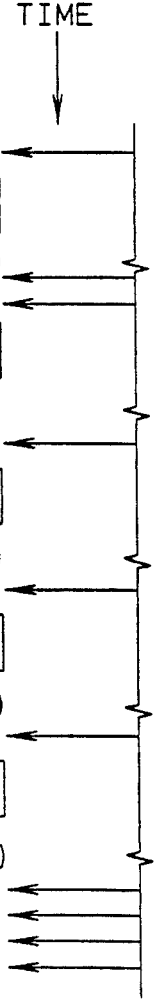
Figure 5C:
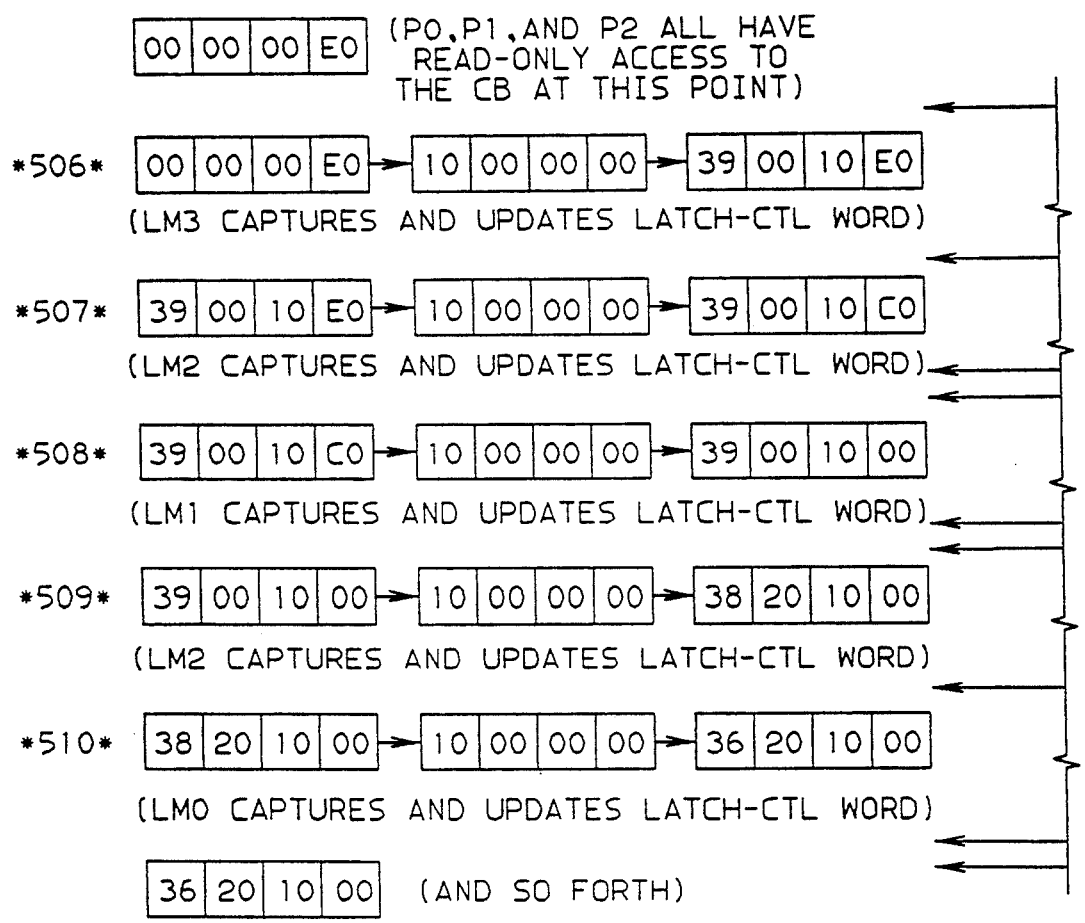
Figure 5D:
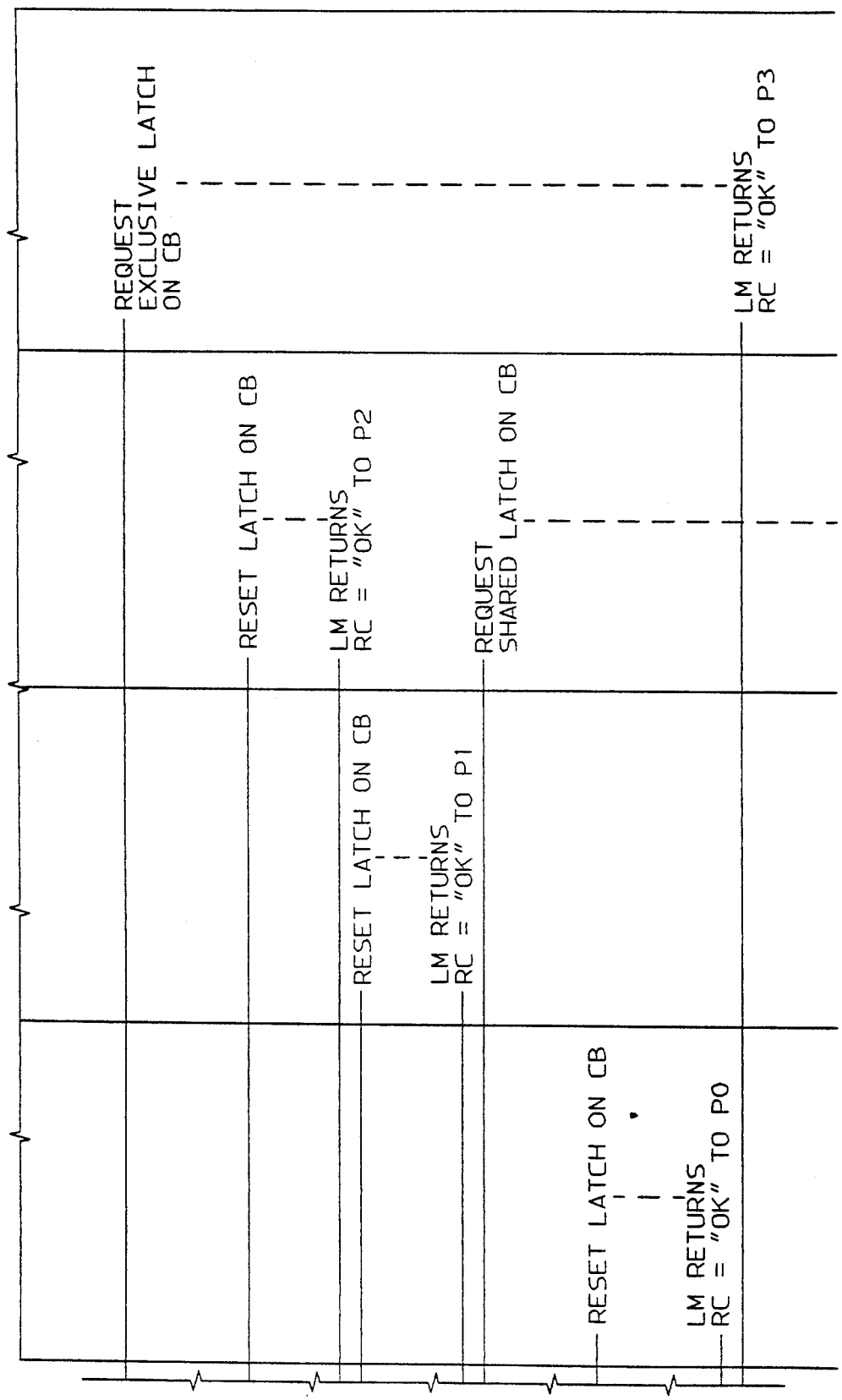

FIG. 5 depicts a latching scenario involving only four of the eight processors in the system. Column 515 contains the contents of the latch-control word after the modifications have been performed which reflect the updated status of the latch. Columns 520, 530, 540 and 550 contain the example actions which are performed by the respective processors, P0–P3, such as requesting access or giving up access. Rows 500–512 are a time ordered progression of the actions requested and the resultant modifications to the latch-control word. In column 515 there are three representations of the latch-control word as it appears in the common memory (each representation is four bytes, expressed in hexadecimal). The first representation is the latch before it is captured, the next is the dummy control word placed in the common memory as latch is being modified, and the final representation is the latch, after modification, as it is stored back into the common memory.

In row 500, the latch is not held by any processor, and no processors are waiting for the latch. Therefore, the latch-control word depicted in column 515 for this row shows zeros in all of the fields. The first action requested in this example scenario is that processor 3 requests exclusive access to the control block (CB). The modifications to the latch-control word to effect this change can be seen in row 501. The zeroed latch-control word is captured and replaced with the dummy control word. The modifications to the latch to reflect the exclusive request by processor 3 result in a latch-control word value of 34 00 10 00 hex. For a clear understanding of the scenarios presented here, reference should be made to the format of the latch-control word depicted in FIG. 1. The 34 hex value in byte zero reflects two changes to the control word. First, the pointer now points to processor 3, and second, the held-exclusive, he, flag has been set. The 00 hex in byte 1 indicate that there are no processors waiting for shared access. The 10 hex in byte 2 indicates that processor 3 has exclusive access to the control block, and the 00 in byte 3 indicates that no processors hold the latch in a shared mode.

Once the modified latch-control word has been released and written back to common memory, the next action in the example scenario is that processor 1 requests the latch in shared mode. The modifications to the latch-control word in response to this request are seen in row 502. The final modified control word will contain a value of 36 40 10 00 hex. The 36 hex in byte 0 still reflects the pointer 0 to processor 3's exclusive bit and the setting of the held-exclusive flag with respect to processor 3's exclusive access, but the shared-waiting flag in byte 0 has also been set to indicate that one of the processors (processor 1 in this example) is waiting for shared access. The 40 hex in byte 1 results from the setting of the shared-waiting bit associated with processor 1. This shared-waiting bit indicates that processor 1 is currently waiting for shared access. The remainder of the bytes of the latch-control word are unchanged as a result of this particular request.

Row 503 depicts the modifications to the latch-control word when processor 2 requests shared access to the control block. The resulting latch-control word has a value of 36 60 10 00 hex. Byte 0 has not changed from the previous status, since the shared-waiting bit has already been set. Byte 1 has changed to a value of 60 hex since the shared-waiting bits associated with both processors 1 and 2 have been set. Again, the remainder of the latch-control word (bytes 2 and 3) remain unchanged after processors 2's shared request has been processed.

Row 504 depicts the modifications to the latch-control word when processor 0 makes a shared access request. The resulting latch-control word has a value of 36 E0 10 00 hex. Byte 0 has not changed from the previous status, since the shared waiting bit has already been set. Byte 1 has changed to a value of E0 hex since the shared-waiting bits associated with processors 0, 1 and 2 have been set. Again, the remainder of the latch-control word (bytes 2 and 3) remain unchanged after this third shared request has modified the latch-control word.

The next action in the example scenario is that processor 3 gives up its exclusive control of the resource (control block). The changes to the latch-control word have been depicted in row 505, and the resultant control word has the value of 08 00 00 E0 hex. The 08 hex in byte 1 indicates that the latch (control block, resource) is currently being held in shared mode. The 00 hex in bytes 1 and 2 indicate that no processor is waiting either for shared mode or exclusive access. The E0 hex in byte 3 indicates that processors 0, 1 and 2 all share access to the control block.

While processors 0, 1 and 2 are sharing access to the control block, processor 3 makes a request for exclusive access. The modified latch-control word as depicted in row 506 has a value of 39 00 10 E0 hex. The 39 hex in byte 0 indicates that the pointer points to processor 3's exclusive bit, the held-shared bit is set (from processors 0, 1 and 2's shared access), and the exclusive-waiting flag is set. The 00 hex in byte 1 indicates that there are no shared requests waiting. The 10 hex in byte 2 indicates that processor 3 is currently waiting for exclusive access and the E0 hex in byte 3 indicates that processors 0, 1 and 2 still hold the control structure in shared mode.

Row 507 depicts the modifications to the latch-control word when processor 2 gives up its shared access to the control block. The resulting latch-control word has a value of 39 00 10 C0 hex. Byte 0 has not changed from the previous status, since processors 0 and 1 still hold the control structure in shared mode (hs flag is set), and processor 3 is still waiting for exclusive access (the pointer points to processor 3 and the ew flag is set). Byte 1 has not changed and is still 00 hex since no processors are waiting for shared access. Byte 2 remains the same and still indicates that processor 3 is waiting for exclusive access. Byte 3 has changed to a value of C0 hex since only processors 0 and 1 are now holding the latch in shared mode.

Row 508 depicts the modifications to the latch-control word when processor 1 gives up its shared access to the control block. The resulting latch-control word has a value of 39 00 10 80 hex. Bytes 0, 1 and 2 did not changed from the previous status, since processor 0 still holds the control structure in shared mode, and processor 3 is still waiting for exclusive access. Byte 3 has changed to a value of 80 hex since only processor 0 currently holds the latch in shared mode.

In row 509, the latch-control word is depicted after processor 2 has again requested shared access to the control structure. Processor 2 cannot be given shared access (even though the control structure is currently held in shared mode by processor 0) because processor 3 has an exclusive request waiting. Processor 3's exclusive request must be granted before a subsequent shared access can be granted (see blocks 231, 251, 253 . . . of setlch, in FIG. 2). The latch-control word which results from processor 2's shared request is a value of 3B 20 10 80 hex. The 3B hex is a result of the setting of: the pointer (pointing to processor 3); the held-shared flag; the exclusive-waiting flag; and now, the shared-waiting flag. Byte 1 now has a value of 20 hex which indicates that processor 2 is waiting for shared access. Bytes 2 and 3 remain unchanged.

In row 510, the latch-control word is depicted after processor 0 has given up its shared access to the control structure. The resulting latch-control word has a value of 36 20 10 00 hex. This latch-control word is the result of the "promotion" of processor 3 to exclusive latch holder. Byte 0 has been modified to reset both the held-shared and exclusive-waiting flags and to set the held-exclusive flag. Byte 1 has not changed, it still indicates that processor 2 is waiting for shared access. Byte 2's 10 hex now indicates that processor 3 holds the control structure exclusively (in combination with byte O's pointer, and the he flag). Byte 3 has been zeroed out since none of the processors currently hold the control structure in shared mode.

This example has been set forth in order to help explain the operation of the setlch and rstlch functions and the resulting modifications to the latch-control word. While particular embodiments of the present invention have been shown and described, it will be understood by those skilled in the art that modifications may be made to a particular embodiment without departing from the true spirit and scope of the present invention.

We claim:

1. A method of controlling access by a plurality of processors to a shared resource, said method comprising the steps of:

reading a latch-control word from a memory location in response to an access request by a first processor, said access request reflecting said first processor's desire for access to said shared resource, said latch-control word indicating an access status of said shared resource;

reading a held-exclusive flag and a held-shared flag from said latch-control word;

granting said first processor access to said shared resource and setting one of said held flags if said held flags indicate said shared resource is not held;

setting one of two waiting flags in said latch-control word if said held flags indicate said shared resource is already held and said one of two waiting flags is not already set, said waiting flags denoting that at least one of said plurality of processors is waiting for access to said resource; and writing said latch-control word back to said memory location.

2. A method according to claim 1 further comprising the step of:

writing a dummy control word into said memory location after reading said latch-control word, said dummy control word denoting said first processor is updating said latch-control word.

3. A method according to claim 2 wherein said desired access is for exclusive access, and said latch-control word includes a plurality of processor exclusive bits, each of said plurality of processor exclusive bits being associated with one of said plurality of processors, said method further comprising the step of:

setting a first processor exclusive bit in said latch-control word.

4. A method according to claim 3 wherein said latch-control word includes a pointer which points to one of said plurality of processor exclusive bits, said method further comprising the step of:

granting access to said first processor when said pointer points to said exclusive bit of said first processor and said held exclusive flag is set.

5. A method according to claim 4 further comprising the step of:

updating said pointer at the request of a second processor, when said second processor releases its exclusive hold on said shared resource.

6. A method according to claim 4 wherein said held-shared flag is set, and said one of two waiting flags was set at the request of said first processor, said method further comprising the step of:

updating said pointer to point to said first processor exclusive bit.

7. A method according to claim 2 wherein said desired access is for shared access.

8. A method according to claim 7 wherein said latch-control word includes a plurality of shared-waiting bits, each of said plurality of shared-waiting bits being associated with one of said plurality of processors, said method further comprising the step of:

setting a first processor shared-waiting bit.

9. A method according to claim 8 wherein said latch-control word includes a plurality of held-shared bits, each of said plurality of held-shared bits being associated with one of said plurality of processors, said method further comprising the step of:

granting access to said first processor when a first processor held-shared bit is set.

10. A method according to claim 7 wherein said held-shared flag is set and an exclusive-waiting flag is not set, said method further comprising the step of:

granting access to said first processor.

11. An apparatus for controlling access by a plurality of processors to a shared resource comprising:

a latch-control word residing in a memory accessible by said plurality of processors, said latch-control word indicating an access status of said share resource;

a held-exclusive flag in said latch-control word, said held-exclusive flag indicating that said shared resource is held exclusively by one of said plurality of processors;

a held-shared flag in said latch-control word, said held-shared flag indicting that said shared resource is held shared by one or more of said plurality of processors;

an exclusive-waiting flag in said latch-control word, said exclusive-waiting flag indicating that at least one of said plurality of processors is waiting for exclusive access to said shared resource;

a shared-waiting flag in said latch-control word, said shared-waiting flag indicating that at least one of said plurality of processors is waiting for shared access to said shared resource;

a means for granting access to a requesting processor if said held flags indicate said shared resource is not held; and a means for setting one of said waiting flags if said shared resource is held.

12. An apparatus according to claim 11 further comprising:

a plurality of shared-waiting bits in said latch-control word, each of said plurality of shared-waiting bits being associated with one of said plurality of processors; and a means for setting a shared-waiting bit associated with a processor requesting shared access if said held-exclusive or exclusive-waiting flags are set.

13. An apparatus according to claim 11 further comprising:

a plurality of processor exclusive bits in said latch-control word, each of said plurality of processor exclusive bits being associated with one of said plurality of processors; and a pointer which points to one of said plurality of processor exclusive bits.

14. An apparatus according to claim 13 further comprising:

a means for granting exclusive access to a processor requesting such access when an exclusive bit associated with said requesting processor is set and said pointer points to said exclusive bit.

15. An apparatus according to claim 13 further comprising:

a semaphore bit in said latch-control word, said semaphore bit indicating that one of said plurality of processors is updating said latch-control word;

a means for setting said semaphore bit when a requesting processor is updating said latch-control word; and a means for resetting said semaphore bit after said requesting processor has updated said latch-control word.

* * * * *